May 14, 1968

H. B. SORENSEN 3,382,709

FASTENER RELAXATION TESTING MACHINE

Filed March 24, 1965

INVENTOR.
Helge B. Sorensen

BY a.m. Heiter

ATTORNEY

United States Patent Office 3,382,709
Patented May 14, 1968

3,382,709
FASTENER RELAXATION TESTING MACHINE
Helge B. Sorensen, Flint, Mich., assignor to General Motors Corporation, Detroit, Mich., a corporation of Delaware
Filed Mar. 24, 1965, Ser. No. 442,306
6 Claims. (Cl. 73—97)

ABSTRACT OF THE DISCLOSURE

A fastener-testing machine for measuring preload in a fastener and for applying and measuring external load on the fastener. The testing machine has a closed, liquid-filled chamber which is connected to a preloaded gauge to measure preload of a fastener specimen. A load-apply chamber is selectively supplied with liquid under pressure to produce an external load which is transmitted by the liquid-filled chamber to act on the preloaded fastener. A gauge is connected to the load-apply chamber to measure the external load applied.

---

This invention relates to testing machines and more particularly to fastener-testing machines for testing fastener tension and permanent set.

When a fastener, such as a bolt, is preloaded by torquing its nut to clamp a joint tightly together, contraction in the bolt threads will occur accompanied by radial expansion of the nut. This nut dilation under torquing is not of any consequence as long as stripping of the threads does not occur. If thread stripping does occur, the bolted joint will often give a torque reading at the nut indicative of a tight joint even though there is actually no preload leaving a loose joint.

When an external joint load is added, a change in bolt load will take place. If this load change is large enough to cause sliding, due to nut dilation, either in the threads or at the nut bearing surface or a combination thereof, there is a probability that the nut under this load variation will eventually come loose due to the thread helix also resulting in a loose joint.

Permanent set in service of a bolted joint often results in a loose joint. It has been found that the chance of a loose or failed joint is minimal as long as the joint member or members under compression are stiffer than the bolt and the bolt preload remains greater than the external joint load after that external load has been experienced for an indefinite period of time.

The principle of this invention lies in a test machine for testing fasteners such as a nut and bolt having a preload-tension unit having a noncompressible liquid filled chamber which chamber is connected to a preload gauge to provide a measurement of bolt preload when the nut is torqued. A load-applying tension unit operatively associated with the preload-tension unit applies a hydraulic axial load acting to create pure tension in the bolt, which external load is indicated by a load-apply gauge, is added after the bolt has been preloaded and may be increased to determine the failure point in tension of the bolt.

Test on permanent set in a fastened joint is accomplished by the test machine as in the case of a bolted joint by torquing the nut to its specified torque to clamp a joint member and noting the corresponding bolt preload on the preload gauge. Then, an external load is added by the load-applying tension unit corresponding to the maximum external load in joint service. When this external load is relieved, the preload will decrease and be indicated by the preload gauge if brinelling has occurred.

An object of this invention is to provide a new and improved test machine for determining preload in a fastener and for applying an external tension load acting on the fastener.

Another object of this invention is to provide a test machine for testing fastener preload and for applying external tension acting on the fastener to determine any decrease in preload after release of the external tension load and to determine the yield tension and failure point in tension of the fastener.

Another object of this invention is to provide a hydraulic test machine for testing nut and bolt specimens including a hydraulic-preload tension unit for determining tension preload in the bolt with the nut torqued and a hydraulic-load apply tension unit for applying an external tension load on the preloaded bolt for determining any decrease in bolt preload on release of the external tension load as indicated by the preload-tension unit to determine permanent set and for determining the failure point in tension of the bolt.

These and other objects of the invention will be more apparent from the following description and drawing in which.

Figure 1:
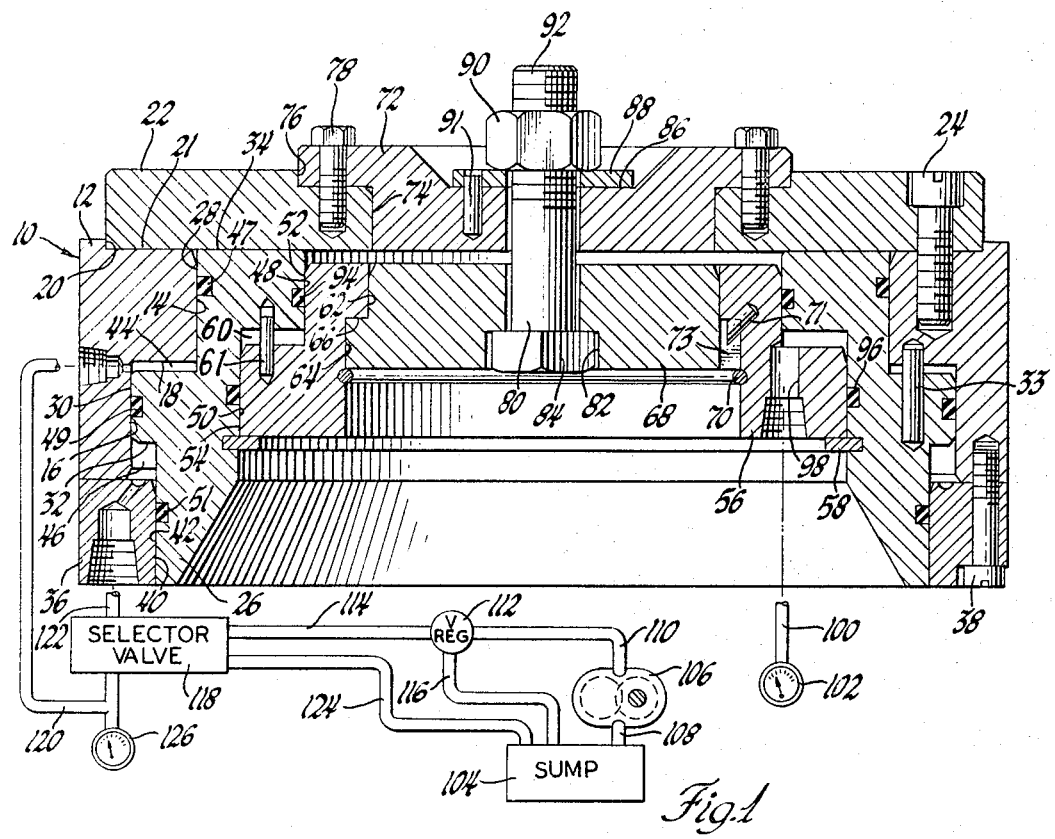
FIGURE 1 shows a test machine constructed according to this invention.

The fastener-testing machine, as shown in FIGURE 1, comprises a stationary housing generally designated at 10 having an annular housing member 12 which member has a central bore 14, a counterbore 16 having a step 18 at the lower or rear end and a counterbore 20 having a step 21 at the upper or front end. An annular front plate support 22 is secured in place against the step 21 of counterbore 20 by circumferentially spaced bolts 24. A stepped annular load-apply and release piston 26 has an outer cylindrical surface 28 slidably received by bore 14 and a second outer cylindrical surface 30 of larger diameter received by counterbore 16, which surface 30 is provided on an annular piston rib extension 32. A dowel pin 33, press fitted in a blind bore in step 18, is slidably received in an accommodating aligned blind bore in piston 26 to prevent relative rotation between piston 26 and housing 10 while permitting the sliding piston movement. The smaller diameter end 34 of piston 26 is abuttable with front plate support 22. A rear annular housing member 36 is secured to the rear end of housing member 12 by circumferentially spaced bolts 38 and has a central bore 40 slidably receiving the cylindrical surface 42 of piston 26, the cylindrical surface 42 being of a diameter less than that of cylindrical surface 30 but greater than that of cyindrical surface 28.

The housing 10 and piston 26 cooperatively provide an annular load-apply chamber 44 on the front side of piston 26 at rib 32 and an annular load-release chamber 46 on the backside of piston 26 at rib 32, the piston 26 thus having an effective pressure responsive area in load-apply chamber 44 greater than that in load-release chamber 46. Chamber 44 is sealed at surface 28 in bore 14 by a seal ring 47 and at surface 30 in counterbore 16 by a seal ring 49. Chamber 46 is sealed by the seal ring 49 and by a seal ring 51 at surface 42 in bore 40.

Piston 26 has a central bore 48 and a counterbore 50 slidably receiving the stepped cylindrical surfaces 52 and 54, respectively, of an inner annular piston 56 which inner piston is retained in the outer piston 26 in the position shown by a retaining ring 58. The outer piston 26 thus acts as a housing for the inner piston and cooperates with the inner piston 56 to provide an annular closed chamber 60 concentric with chambers 44 and 46. A dowel pin 61 press fitted in inner piston 56 is slidably received in an accommodating aligned bore in outer piston 26 to prevent relative rotation between these pistons.

The inner piston 56 in turn has a bore 62 and a counterbore 64 against whose step 66 and collar of a rear annular adapter plate 68 is held by a retainer ring 70. A pin 71 press fitted in a blind bore in piston 56 is received in an axially extending groove 73 in the collar of adapter plate 68. Thus, the rear adapter plate 68 is securely held in position in the inner piston 56.

A front annular adapter plate 72 is received by a bore 74 and a counterbore 76 in front plate support 22 and has its collar secured to the step of counterbore 76 by circumferentially spaced bolts 78. The adapter plates are for connecting the test specimen to the test machine. For purposes of demonstration, a bolt 80, a washer 88 and a nut 90 comprise the test specimen. For this test specimen, both the front and rear adapter plates 72 and 68 are centrally apertured to accommodate the test bolt 80 and locate the bolt axis on the inner and outer piston axes so all their axes are thus coincidental. The lower end of the rear adapter plate 68 has a flat sided recess 82 to accommodate the flat sided head 84 of test bolt 80 to prevent relative rotation. The front side of the front adapter plate 72 has a flat bottom recess 86 to accommodate the flat test washer 88 for the test nut 90 which nut engages the bolt thread 92. A pin 91 prevents relative rotation between washer 88 and plate 72.

The closed chamber 60 is filled with a liquid, preferably oil, chamber 60 being sealed at surface 52 in bore 48 by a seal ring 94 and at surface 54 in counterbore 50 by a sael ring 96. Chamber 60 is connected by a port 98 and a line 100 to a hydraulic gauge 102 responsive to hydraulic pressure and calibrated to provide a force read out in pounds. Thus, with a test specimen, such as bolt 80 and nut 90, installed in the adapter plates and then torqued by a suitable torque wrench applied to nut 90, an axial compression load equal to the resulting tension load on the bolt will be exerted by the inner piston 56 on the outer piston 26 through their rigid hydraulic linkage provided by the noncompressible oil filled chamber 60, outer piston 26 being held against upward movement by the housing stop provided by the inner face of support 22. The oil in chamber 60 will thus experience this compression load and therefore the bolt preload tension will be registered directly on the preload gauge 102 in pounds force. The corresponding torque can be read on the torque wrench.

Fluid pressure delivered to load-apply chamber 44 will tend to force piston 26 downwardly from its no-load position shown in FIGURE 1, which outer piston 26 by its rigid hydraulic linkage with inner piston 56 provided by oil filled chamber 60 will then apply pure tension to the bolt 80. Alternatively, when the load-apply chamber is exhausted and fluid pressure is delivered to load-release chamber 46, the external tension loading by the outer piston 26 is relieved and the piston 26 is returned to its no-load position. The fluid circuitry for loading and unloading outer piston 26 and thus inner piston 56 comprises a collecting sump 104 from which fluid, preferably oil, is drawn by a conventional motor driven positive displacement gear type pump 106 via a suction line 108 and delivered via a discharge line 110 to a pressure regulator valve 112.

Regulator valve 112 regulates the pressure to a predetermined value for a connected main line 114 and exhausts overage via an exhaust line 116 to sump 104. Regulator valve 112 is adjustable to provide different main line pressures. The oil pressure in main line 114 is deliverable via a selector valve 118 to a load-apply line 120 connected to load-apply chamber 44, while at the same time, exhausting load-release chamber 46 via its connected load-release line 122 to a selector valve exhaust line 124 for return to sump 104. Alternatively, selector valve 118 is conditionable to connect the load-apply line 120 to exhaust line 124 for exhaust and at the same time to connect the main line 114 to the load-release line 122 and connected load-release chamber 46. A load-apply gauge 126 connected to the load-apply line 120 is responsive to oil pressure and is calibrated to read in pounds force. The regulator valve 112 and the selector valve 118 may be of any suitable known type.

When the nut 90 is torqued to create a preload in the bolt 80, contraction in the bolt threads 92 will take place and at the same time, the nut 90 will expand radially. The greatest movement of the nut 90 will be at its bearing surface with the washer 88. This nut dilation under torquing is not of any consequence as long as stripping of the threads cannot occur. When an external tension load is added, a change in the bolt preload will take place when the external tension load is relieved. If this preload change is great enough to cause sliding, due to nut dilation, either in the threads or between the nut bearing surface and its washer 88 or a combination thereof, it is probable that the nut under such load variation eventually will come loose due to the thread helix. It has been found that a rule for how much bolt load variation can be tolerated cannot be given, there being a necessity to resort to actual testing.

Permanent set in the service of a bolted joint produces a drop in preload and often results in loose joints. It has been found that the bolt preload must always be greater than the external load so that the permanent set due to external loading will be tolerable. Therefore, load-deflection tests must often be performed to find actual stiffness relationships and permanent set.

Figure 2:
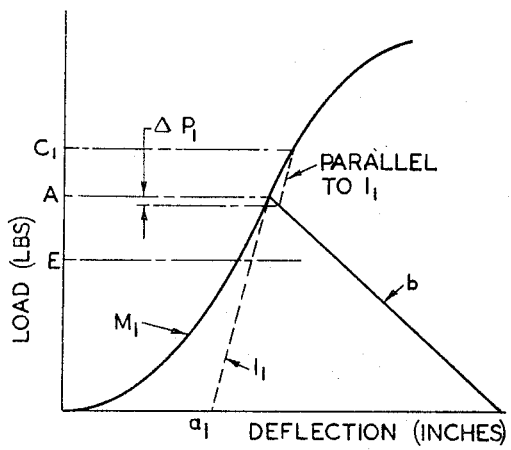
FIGURE 2 shows the load-deflection characteristics of a bolted joint.
Figure 3:
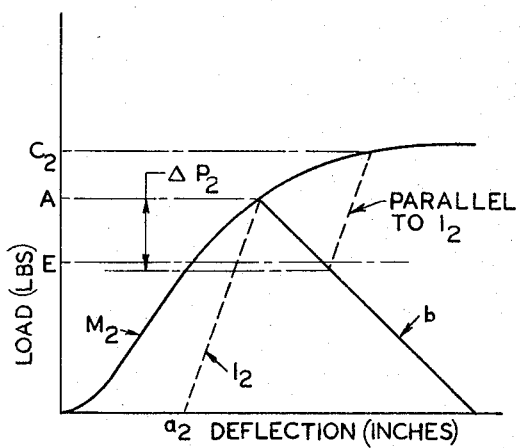
FIGURE 3 shows the load-deflection characteristics of another bolted joint.

For example, there is shown in FIGURES 2 and 3, the load-deflection curves for two joint members having different strength properties, namely, member $M_1$ as shown in FIGURE 2, which member $M_1$ has been heat treated, and member $M_2$ as shown in FIGURE 3, which member $M_2$ has not been heat treated. The two members are both preloaded to A pounds by means of identical bolts, $b$ being the load-deflection curve for the bolt in each case. If the load from A pounds is relieved to zero and increased to A again, the member stiffness will be found as the inclination of the load-deflection curves $l_1$ and $l_2$, ignoring a slight hysteresis which normally would occur.

In both cases, the members $M_1$ and $M_2$ have spring rates larger than the bolt. $C_1$ and $C_2$ pounds are the maximum joint loads experienced by the addition of the maximum external force E pounds anticipated in service. In the case of $M_1$, only a slight drop in preload ($\Delta P_1$) results from removal of force E and the joint would probably never fail, whereas in the case of $M_2$, the chance of failure would be greater, since the preload dropped below the maximum external load E as indicated by the preload drop ($\Delta P_2$). Repeated application of load E in the case of $M_2$ would cause joint separation.

In the case of member $M_1$, a permanent set of $a_1$ inches took place while the bolt was torqued, $a_2$ inches being the permanent set which took place while the bolt was torqued in the case of member $M_2$. This permanent set in the case of $M_1$ has no significance. Thus, the probability of joint failure is minimal as long as the clamped member is stiffer than the bolt, the unit load at the clamped surfaces does not exceed the elastic limits of these members and the preload remains greater than the external load after that load has been experienced for an indefinite length of time.

With the above fundamentals for bolted joints in mind, the operation of the test machine of this invention to test the test specimen illustrated will now be described, it being readily understood that the test machine is suited for other types of fasteners such as rivets. First, for tests on permanent set, the test specimen comprising bolt 80, washer 88 and nut 90 is installed in position, as shown in FIGURE 1. A torque wrench is then applied to torque nut 90 to its specified design torque to clamp the joint member, which in this case is washer 88. Thus, this particular permanent set test will be testing the nut bearing area of nut 90 against this kind of clamped member, namely washer 88. The axial compression load increase in the oil filled chamber 60 is registered directly on the preload gauge 102 in pounds to provide measurement of the tension preload of bolt 80, which measurement is noted. Regulator valve 112 is adjusted to regulate to a preselected pressure which pressure is calculated to provide a force, as indicated by the load-apply gauge 126, acting on piston 26 and thus piston 56 and connected bolt 80 corresponding to the maximum joint load to be experienced in the application of bolt 80 and nut 90 in service, the oil filled chamber 60 transmitting the load from piston 26 to piston 56. Selector valve 118 is then conditioned to deliver this pressure to load-apply chamber 44 while at the same time exhausting the load-release chamber 46. Then, when this maximum external load is relieved and piston 26 is returned to its no-load position by operation of selector valve 118, the preload will decrease as indicated by preload gauge 102 if brinelling has taken place. By control of selector valve 118, this loading can be sustained or cycled as many times as desired and an indication of the chance of joint failure for this particular bolted joint resulting from permanent set can be determined by observing whether the preload remains greater than the external load after the external load has been experienced for a long period of time or for a repeated number of times. The repeated loadings will also show whether the nut will come loose due to nut dilation and the thread helix.

Test for thread stripping is obtained by applying a torque wrench to nut 90 and noting the preload registered directly on preload gauge 102 as the torque on nut 90 is increased. With continued torque increase, it can be observed whether or not the bolt fails in tension prior to stripping of the threads and if there is no thread stripping, the point at which tension starts to fall off. Thus, the yield tension can be determined, which yield tension shows the maximum tension that can be obtained with the bolt. By this test, overtorquing of the nut can be made to cause bolt failure in tension at installation to protect against a faulty joint. Another feature of this test machine is that if the nut or bolt threads strip, tension can be applied by the load-apply chamber 44 to part the nut and bolt for removal from the machine.

The above-described preferred embodiment is illustrative of the invention which may be modified within the scope of the appended claims.

I claim:
1. In fastener-testing machine the combination of
 (a) a pair of coaxially mounted members,
 (b) first hydraulic means including a liquid filled noncompressible chamber located between said members for measuring an axial load produced by a preloaded fastener acting to urge said members together,
 (c) and second hydraulic means including a hydraulic motor having an expansible chamber operatively connected in series with said first hydraulic means between said members for applying an axial load which is transmitted by the liquid in said noncompressible chamber to urge said members apart to apply tension on the fastener and also for measuring the applied load.
2. In a fastener-testing machine the combination of
 (a) a motor having a cylindrical piston mounted for movement along an axis, a load-apply chamber effective when supplied with fluid pressure to apply a load to urge said motor piston from a limited position in one axial direction,
 (b) load-transmitting means wholly mounted on said motor piston having a load-transmitting piston, a liquid filled chamber between said pistons preventing movement of said load-transmitting piston relative to said motor piston in the opposite axial direction for transmitting load between said pistons.
 (c) said motor having stationary means for holding one end of a fastener specimen to be tested,
 (d) said load-transmitting piston having means for holding the other end of the fastener specimen,
 (e) means connected to said liquid filled chamber for measuring the load acting on said load-transmitting piston when said motor piston is in said limited position and the fastener specimen is preloaded to urge said pistons together,
 (f) and means connected to said load-apply chamber for measuring the load acting on said motor piston and transmitted by said load-transmitting means to the fastener specimen when said load-apply chamber is supplied with fluid pressure.
3. In a fastener-testing machine the combination of
 (a) a motor having a cylindrical piston mounted for movement along an axis, a load-apply chamber effective when supplied with fluid pressure to apply a load to urge said motor piston from a limited position in one axial direction,
 (b) load-transmitting means housed in said motor piston having a load transmitting piston, a liquid filled chamber between said piston preventing movement of said load transmitting piston relative to said motor piston in the opposite axial direction for transmitting load between said pistons,
 (c) said motor having stationary means providing an aperture having a center on said axis to accommodate a fastener specimen to be tested,
 (d) said load transmitting piston having means providing an aperture having a center on said axis to accommodate the fastener specimen,
 (e) preload-measuring means connected to said liquid filled chamber for measuring the load acting on said load transmitting piston when said motor piston is in said limited position and the fastener specimen is preloaded to urge said pistons together,
 (f) and external load-measuring means connected to said load-apply chamber for measuring the load acting on said motor piston and transmitted by said load-transmitting means to the fastener specimen when said load-apply chamber is supplied with fluid pressure.
4. In a fastener-testing machine the combination of
 (a) a housing having a cylindrical bore and a stop,
 (b) a first cylindrical piston mounted in said housing bore for movement along an axis and having an internal cylindrical bore, said first piston and said housing cooperatively providing a load-apply chamber, said load-apply chamber when supplied with fluid pressure being effective to urge said first piston in one axial direction, said first piston being movable in the opposite axial direction to abut said housing stop,
 (c) a second cylindrical piston mounted in said first piston's internal bore, said second piston and said first piston cooperatively providing a closed chamber, liquid filling said closed chamber preventing movement of said second piston relative to said first piston in said opposite axial direction,
 (d) said housing having means to hold one end of a fastener specimen to be tested aligned with said axis,
 (e) said second piston having means to hold the other end of fastener specimen aligned with said axis,
 (f) a preload gauge responsive to liquid pressure connected to said closed chamber to measure the tensile preload acting on the fastener specimen when said first piston is against said stop and the fastener specimen is preloaded in tension and urges said second piston in said opposite axial direction,
 (g) and fluid circuit means having fluid under pressure, valve means for selectively delivering said fluid pressure to said load-apply chamber and for exhausting said load-apply chamber, a load-apply gauge responsive to fluid pressure connected to said load-apply chamber to measure the added tensile load acting on the preloaded fastener specimen when said load-apply chamber is supplied with said fluid pressure.

5. In a fastener-testing machine the combination of
(a) a housing having a cylindrical bore and a stop,
(b) a first cylindrical piston mounted in said housing bore for movement along an axis and having an internal cylindrical bore concentric with said housing bore, said first piston and said housing cooperatively providing a load-apply chamber and a load-release chamber, said load-apply chamber when supplied with fluid pressure being effective to urge said first piston in one axial direction, said load-release chamber when supplied with fluid pressure being effective to urge said first piston in the opposite axial direction and against said housing stop,
(c) a second cylindrical piston mounted in said first piston's internal bore, said second piston and said first piston cooperatively providing a closed chamber, liquid filling said closed chamber preventing movement of said second piston relative to said first piston in said opposite axial direction,
(d) said housing having means providing an aperture having a center on said axis to accommodate the bolt of a nut and bolt specimen to be tested,
(e) said second piston having means providing an aperture having a center on said axis to accommodate the test bolt,
(f) a preload gauge responsive to liquid pressure connected to said closed chamber to measure the tensile preload acting on the test bolt when said first piston is against said stop and the test nut is torqued on the test bolt to urge said second piston in said one axial direction,
(g) and hydraulic circuit means having liquid under a predetermined pressure, valve means for selectively delivering said predetermined liquid pressure to said load-apply chamber and said load-release chamber and for exhausting the chamber not being supplied with liquid pressure, a load-apply gauge responsive to liquid pressure connected to said load-apply chamber to measure the added tensile load acting on the preloaded test bolt when said load-apply chamber is supplied with said predetermined liquid pressure whereafter on exhaust of said load-apply chamber and delivery of said predetermined liquid pressure to said load-release chamber said first piston is returned to said housing stop and said preload gauge again measures the preload acting on the test bolt.

6. In a fastener-testing machine the combination of
(a) a housing having a cylindrical bore and a stop,
(b) a first cylindrical piston mounted in said housing bore for movement along an axis and having an internal cylindrical bore concentric with said housing bore, said first piston and said housing cooperatively providing a load-apply chamber and a load-release chamber, said load-apply chamber when supplied with fluid pressure being effective to urge said first piston in one axial direction, said load-release chamber when supplied with fluid pressure being effective to urge said first piston in the opposite axial direction and against said housing stop,
(c) a second cylindrical piston mounted in said first piston's internal bore and having a central aperture, said second piston and said first piston cooperatively providing a closed chamber, liquid filling said closed chamber preventing movement of said second piston relative to said first piston in said opposite axial direction,
(d) a first adapter member secured to said housing and having a central aperture having a center on said axis to accommodate the bolt of a nut and bolt specimen to be tested,
(e) a second adapter member secured in the aperture in said second piston and having a central aperture having a center on said axis to accommodate the test bolt,
(f) a preload gauge responsive to liquid pressure connected to said closed chamber to measure the tensile preload acting on the test bolt, when said first piston is against said housing stop and the test nut is torqued on the test bolt to urge said second piston in said one axial direction,
(g) and hydraulic circuit means including a pump operable to deliver liquid under pressure, regulator valve means for regulating said liquid under pressure to a predetermined liquid pressure, selector valve means for selectively delivering said predetermined liquid pressure to said load-apply chamber and said load-release chamber and for exhausting the chamber not being supplied with liquid pressure, a load-apply gauge responsive to liquid pressure connected to said load-apply chamber to measure the added tensile load acting on the preloaded test bolt when said load-apply chamber is supplied with said predetermined liquid pressure whereafter on exhaust of said load-apply chamber and delivery of said predetermined liquid pressure to said load-release chamber said preload gauge measures any preload decrease in the test bolt.

References Cited
UNITED STATES PATENTS 2,978,898    4/1961    Skidmore    73—1
3,138,952    6/1964    Dobbins    73—95

JAMES J. GILL, *Primary Examiner.*

RICHARD C. QUEISSER, *Examiner.*

J. H. WILLIAMSON, *Assistant Examiner.*